US006555738B2

(12) United States Patent
Hughes et al.

(10) Patent No.: US 6,555,738 B2
(45) Date of Patent: Apr. 29, 2003

(54) AUTOMATIC MUSIC CLIPPING FOR SUPER DISTRIBUTION

(75) Inventors: David A. Hughes, New York, NY (US); Matthew A. Carpenter, New York, NY (US); Mandana Massiha, New York, NY (US); Phuong L. Nguyen, Wayne, NJ (US)

(73) Assignees: Sony Corporation, Tokyo (JP); Sony Music Entertainment Inc., New York, NY (US)

( * ) Notice: Subject to any disclaimer, the term of this patent is extended or adjusted under 35 U.S.C. 154(b) by 0 days.

(21) Appl. No.: 09/838,966

(22) Filed: Apr. 20, 2001

(65) Prior Publication Data

US 2002/0152875 A1 Oct. 24, 2002

(51) Int. Cl.[7] ........................ G06F 17/60; G10H 1/26

(52) U.S. Cl. ........................ 84/609; 84/649; 705/26; 705/27

(58) Field of Search ................ 84/609–614, 634–638, 84/649–652, 666–669, 645, 603–607; 705/26, 27

(56) References Cited

U.S. PATENT DOCUMENTS

| | | | | | |
|---|---|---|---|---|---|
| 5,340,939 | A | * | 8/1994 | Kumagi | 84/609 |
| 5,734,118 | A | * | 3/1998 | Ashour et al. | 84/609 |
| 5,734,119 | A | * | 3/1998 | France et al. | 84/645 X |
| 5,777,249 | A | * | 7/1998 | Suzuki | 84/604 |
| 5,890,910 | A | | 4/1999 | Tsurumi et al. | |
| 5,918,213 | A | * | 6/1999 | Bernard et al. | 705/26 |
| 5,947,746 | A | | 9/1999 | Tsai | |
| 5,953,005 | A | | 9/1999 | Liu | |
| 6,093,880 | A | * | 7/2000 | Arnalds | 84/645 X |
| 6,229,769 | B1 | * | 5/2001 | Packer | 369/33 |
| 6,248,946 | B1 | | 6/2001 | Dwek | |
| 6,256,623 | B1 | | 7/2001 | Jones | |
| 6,263,313 | B1 | | 7/2001 | Milsted et al. | |

* cited by examiner

*Primary Examiner*—Stanley J. Witkowski
(74) *Attorney, Agent, or Firm*—Miller Patent Services; Jerry A. Miller

(57) ABSTRACT

A method of sampling a music selection to produce a music clipping suitable for super distribution. A computer readable music file is sampled by defining a starting point for the sample at a fixed time from the beginning of the music selection. The stopping point is similarly selected as a fixed time from the starting point for the sample. The actual fixed times can be varied based upon the genre of the music when another embodiment flags or headers can be used to define the starting and ending time of the sample. Once the sample has been defined, data from the sample is extracted and compressed to reduce the file size to a size suitable for super distribution.

58 Claims, 5 Drawing Sheets

AUTOMATIC MUSIC CLIPPING FOR SUPER DISTRIBUTION

FIELD OF THE INVENTION

This invention relates generally to the field of creating samples of music. More particularly, this invention relates to automatically creating samples of music for use in so called super distribution.

BACKGROUND OF THE INVENTION

In recent years, providing samples of a musical selection has become a popular marketing tool for record companies as well as other organizations marketing music. By creating electronic samples of a computer readable music file, the samples can be distributed as a marketing tool according to various schemes often referred to as super distribution. In other embodiments, music samples are used as promotional tools at record stores, kiosks and the like.

Traditionally, the creation of such music samples has been a manual process. In creating such samples, an engineer or other entity listens to the music selection and identifies the selection's so-called "hook." The "hook" is the familiar or repetitive part of a song, perhaps including a chorus, that is believed to be representative of the song and is believed to be most suitable to pique the prospective buyer's interest. The engineer then generally extracts a small segment of music from the overall music selection, generally starting somewhat before the hook and extending slightly past it.

While this technique may provide a nearly optimized mechanism for selecting a portion of the music to sample that is believed by marketers or music experts to be most attractive to potential buyers, the labor intensiveness of such a process is undesirable. The labor intensiveness may limit the availability and thus the distribution of such samples. Moreover, the casual listener may be discouraged from creation of samples by the need for specialized editing software.

SUMMARY OF THE INVENTION

The present invention relates generally to creation of music samples. Objects, advantages and features of the invention will become apparent to those skilled in the art upon consideration of the following detailed description of the invention.

In one embodiment of the present invention method of creating a sample of a computer readable audio file includes identifying a starting point for the sample in the audio file, the starting point being at a fixed time $T_{start}$ measured from the beginning of the audio file; identifying an ending point for the sample in the audio file, the ending point being at a fixed time $T_{start}+T_{sample}=T_{stop}$ from the beginning of the audio file; and storing audio data representing the audio between $T_{start}$ and $T_{stop}$ as an audio sample file.

A method of creating a sample of a computer readable file containing entertainment content consistent with embodiments of the present invention includes identifying a starting point for the sample in the file, the starting point being identified by information embedded within the file; identifying an ending point for the sample in the file, the ending point being identified by information embedded within the file; and storing data representing the content between the starting point and the ending point as a sample file.

An electronic storage medium consistent with certain embodiments of the invention stores instructions which, when executed on a programmed processor, carry out a process of creating a sample of content stored as a computer readable file by identifying a starting point for the sample in the file, the starting point being at a fixed time $T_{start}$ measured from the beginning of the file; identifying an ending point for the sample in the file, the ending point being at a fixed time $T_{start}+T_{sample}=T_{stop}$ from the beginning of the file; and storing data representing the content between $T_{start}$ and $T_{stop}$ as a sample file.

An electronic storage medium consistent with certain other embodiments of the invention stores instructions which, when executed on a programmed processor, carry out a process of creating a sample of content stored as a computer readable file, by identifying a starting point for the sample in the file, the starting point being identified by information embedded within the file; identifying an ending point for the sample in the file, the ending point being identified information embedded within the file; and storing music data representing the content between the starting point and the ending point as a sample file.

A method, consistent with certain embodiments of the invention, of creating a sample of content stored in a computer readable file includes identifying a starting point for the sample in the file, the starting point being at a fixed time $T_{start}$ measured from the beginning of the file; identifying an ending point for the sample in the file, the ending point being at a fixed time $T_{start}+T_{sample}=T_{stop}$ from the beginning of the file; and storing data representing the content between $T_{start}$ and $T_{stop}$ as a sample file.

An apparatus consistent with an embodiment of the invention that creates a sample of a computer readable audio file includes a programmed processor. A program operates on the programmed processor to identify a starting point for the sample in the audio file, the starting point being at a fixed time $T_{start}$ measured from the beginning of the audio file, and identify an ending point for the sample in the audio file, the ending point being at a fixed time $T_{start}+T_{sample}=T_{stop}$ from the beginning of the audio file. The audio data representing the audio between $T_{start}$ and $T_{stop}$ as an audio sample file.

An electronic storage medium consistent with embodiments of the invention includes a digital file containing electronic entertainment content and instructions, embedded within the digital file, that define a starting point and an ending point of a predefined sample of the electronic entertainment content when read by a programmed processor.

A method and apparatus of sampling a music selection to produce a music clipping suitable for super distribution, according to embodiments of the invention, sample a computer readable music file or other content file by defining a starting point for the sample at a fixed time from the beginning of the music selection. The stopping point is similarly selected as a fixed time from the starting point for the sample. The actual fixed times can be varied based upon the genre of the music when another embodiment flags or headers can be used to define the starting and ending time of the sample. Once the sample has been defined, data from the sample is extracted and compressed to reduce the file size to a size suitable for super distribution.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
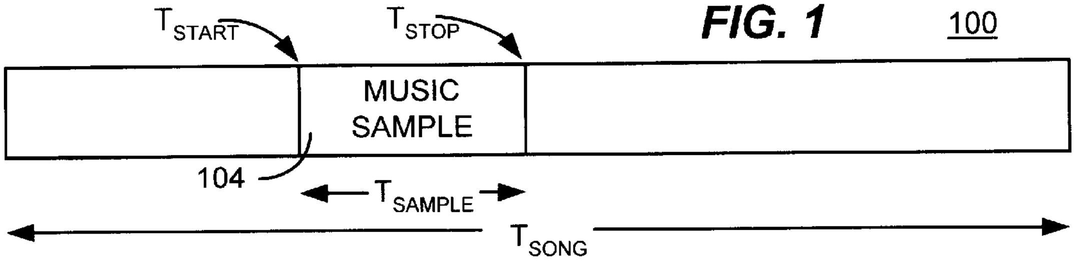
FIG. 1 illustrates a music or other audio sample within a digital music file.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Referring now to FIG. 1, a music file, or other audio file, is generally represented as 100. The music file can be viewed as a linear file of data extending from left to right as time increases in FIG. 1. When streamed from a server or disc drive or the like, the music file 100 will play for a time duration shown as $T_{SONG}$. The desired music sample including the so-called "hook" (i.e., a memorable passage of the music that is likely to attract a potential buyer's attention), can be represented as a segment of the file shown as "music sample" 104 starting at times $T_{START}$ and ending at time $T_{STOP}$. Depending on the individual music selection and also dependent in general upon the particular genre of music, the start of the hook is generally located somewhere around 45 to 60 seconds into a typical 3 minute popular music selection. With other genres of music, such as jazz or classical music, the hook might appear significantly later or earlier. Additionally, for example, 1950s rock and roll hooks typically occur somewhat sooner. Thus, the start time for the sample may range from about 30 to about 60 seconds.

Generally speaking, current mass marketed music that may benefit most from the music sampling described herein falls within the category of popular music. In this case, the hook typically starts, as previously noted, between 45 and 60 seconds into the selection. Thus, a music sample of approximately 30 seconds can be generated by simply taking a clipping from the original music file starting at approximately 45 to 60 seconds (or slightly earlier, e.g., 5 to 15 seconds earlier) and lasting for a duration of approximately 30 seconds. For jazz or classical selections, it is beneficial to take a longer music selection of perhaps 45 to 60 seconds since a 30 second clip may not present a representative sample of the music selection.

Figure 2:
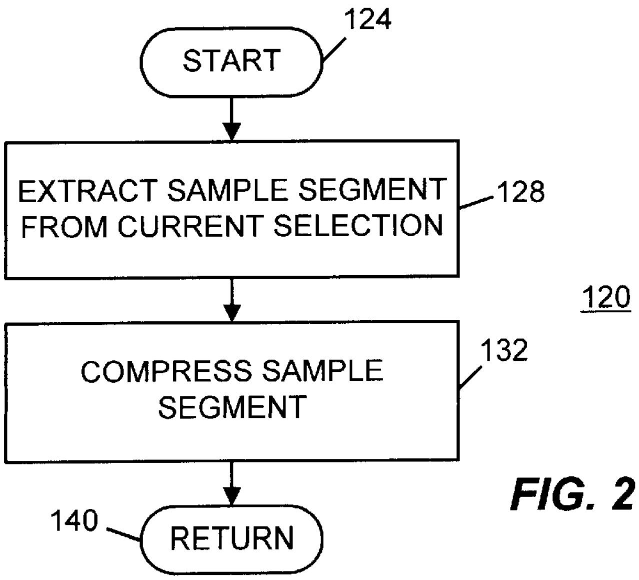
FIG. 2 is a high level flow chart of a music clipping process consistent with embodiments of the present invention.

Referring now to FIG. 2, an overall process for creating a music clipping suitable for super distribution is illustrated as process 120 that starts at 124. Generally the music sample is extracted as a segment of the music selection file 100 at 128. At 132 the selected sample segment is compressed using any suitable compression technique to reduce the file size. Any suitable compression technique can be utilized for this purpose including lossy compression techniques and reduction of the data rate (the streaming data rate) associated with the music selection. In general, although such compression degrades the fidelity of the resulting sample segment, it is more desirable to degrade the sample quality somewhat then to have a resulting sample file that is large and thus more difficult to readily distribute (for example, over the Internet). At 140 the process terminates to return a music clipping for use. This process can be carried out by the end user, retail establishment, record company, publicist, marketing concern, artist or other private or commercial entity interested in promoting the audio selection.

Figure 3:
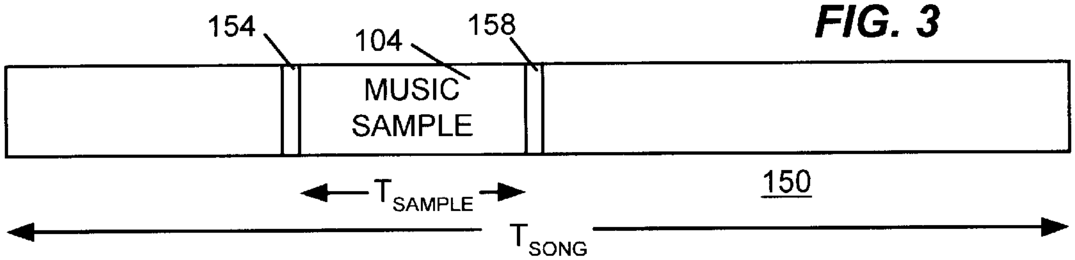
FIG. 3 illustrates a music sample within a digital audio file using start and stop flags.

In accordance with the embodiment illustrated in FIG. 1, a fixed starting time is defined (e.g., 45 seconds from the start of the music selection) for extracting the music sample and the sample duration $T_{SAMPLE}$ is also predefined (e.g., 30 seconds) to create a generally applicable music clipping. However, other techniques can also be utilized to perform the initial extraction of the sample segment (i.e. 128 of FIG. 2). FIG. 3 illustrates a second technique for creating a music sample (or other audio or video sample) consistent with the embodiment of the present invention. In this embodiment, the sample is defined in the production and manufacturing process. In this technique, a preferred music sample 104 is preceded by a start flag shown as 154 and may also be followed by a stop flag shown as 158. Alternatively, only a start flag 154 may be used in conjunction with a predefined sample time defining the stopping point. In this embodiment, the sample can be automatically extracted from the file 150 by simply scanning the file for the location of start flag 154 and possible stop flag 158. Such flags can be readily embedded in a music file and can be ignored by the music file playing or, if interpreted by the player as music data, these flags are of such short duration as to be unlikely to be noticed by the human ear. The recorded audio along with start and stop flags can be recorded on any suitable electronic storage medium such as a compact disc.

A third technique for extracting a sample segment as in 128 of FIG. 2 is illustrated in connection with the use of file 170 of FIG. 4. In this example, the music file 170 (or other audio or video file) includes a header 174 containing data relating to the music file 170. A portion of this data in header 174 can be defined to be either a starting packet number or starting time associated with the music sample as well as possibly an ending packet number or ending time associated with the music sample. Alternatively, a sample duration could be specified. The recorded audio along with start and stop flags can be recorded on any suitable electronic storage medium such as a compact disc. Many variations of these techniques will occur to those skilled in the art and can be adapted for use with video as well as audio.

Figure 5:
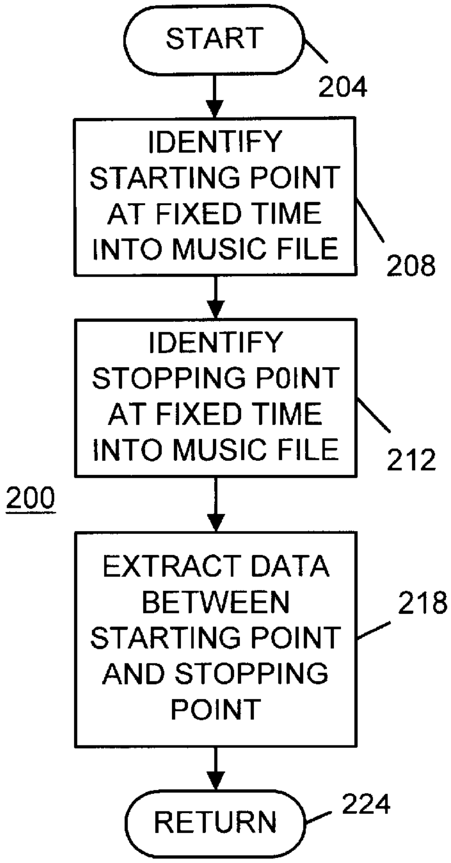
FIG. 5 is a flow chart of an embodiment of a sampling technique consistent with certain embodiments of the invention.

Referring now to FIG. 5, a process for deriving a music sample as illustrated in FIG. 1 is shown as process 200. The process starts at 204. At 208, a starting point $T_{START}$ is identified as a fixed time from the beginning of the music file. At 212, a stopping point $T_{STOP}$ is identified as a fixed time into the audio file or equivalently a fixed time at $T_{START}$. At 218, the data between the starting point $T_{START}$ and the stopping point $T_{STOP}$ is extracted to define the segment of music to be used in creation of the sample. The process then returns at 224. Of course, those skilled in the art will appreciate that the extraction of the data may begin as soon as the starting point is identified. The extraction can then proceed until the sample time has expired or until the stopping point $T_{STOP}$ is encountered.

Figure 4:
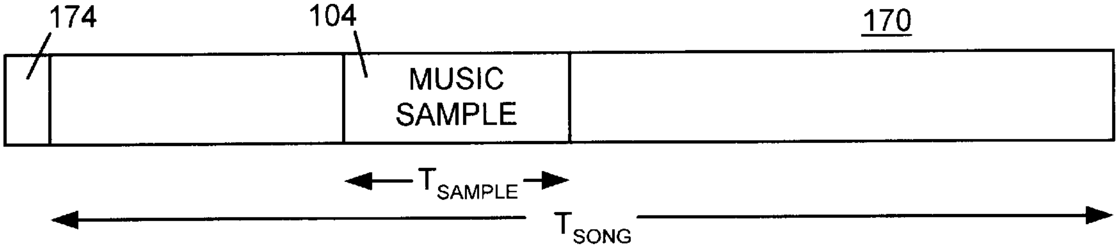
FIG. 4 illustrates a music sample within a digital audio file using a header to define a sample.
Figure 6:
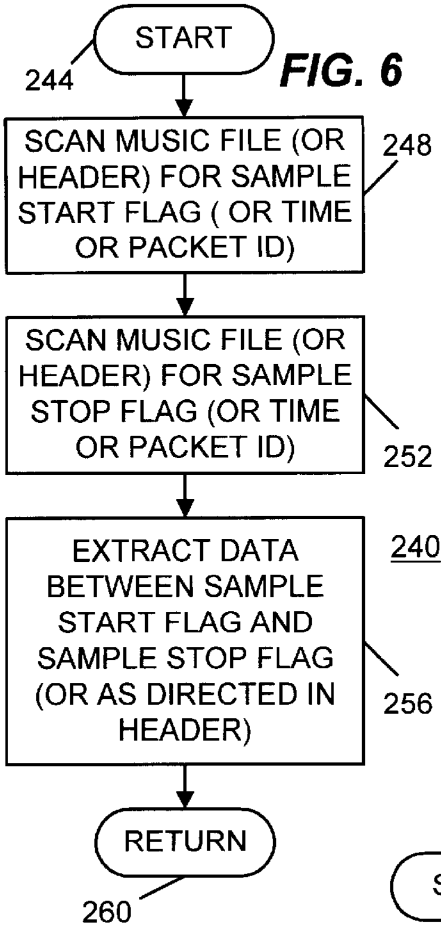
FIG. 6 is a flow chart of another embodiment of a sampling technique consistent with certain embodiments of the invention.

Referring now to FIG. 6, a process 240 starting at 244 describes the processes for extracting a sample segment from file 150 of FIG. 3 in file 170 of FIG. 4. At 248 the header 174 is scanned for a sample start flag for starting time or starting packet identifier. At 252 the music file or header is scanned for the sample stop flag (or time or packet ID.) At 256 the data between the sample start and sample stop indicators (flag, time or packet ID) to define the sample segment to be used for ultimate creation of music clippings. The process returns at 260. Of course, those skilled in the art will appreciate that the extraction of the data may begin as soon as the starting point is identified. The extraction can then proceed until the sample time has expired or until the stopping point $T_{STOP}$ is encountered.

Figure 7:
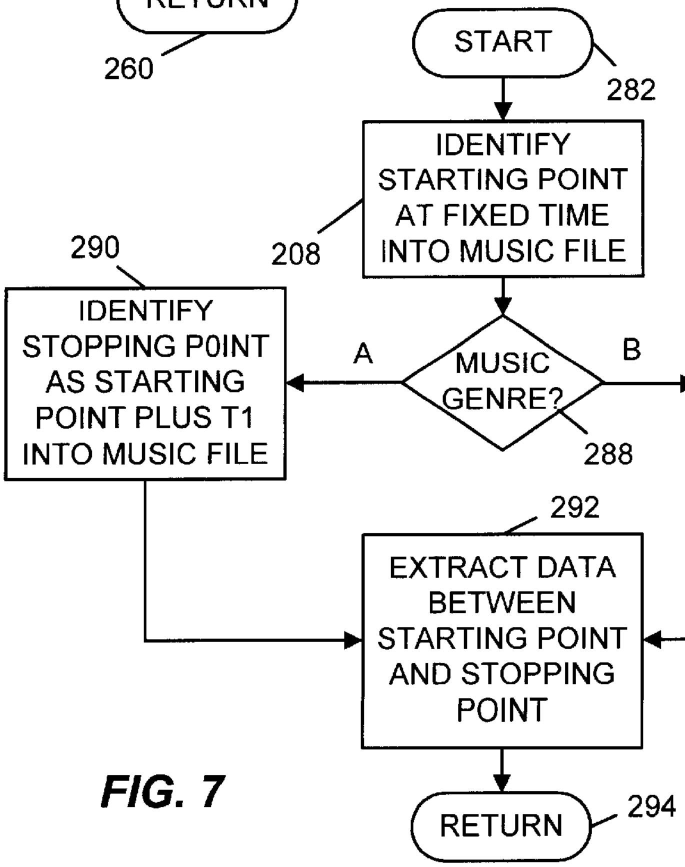
FIG. 7 is a flow chart of a third embodiment of a sampling technique consistent with certain embodiments of the invention.

Referring now to FIG. 7, a variation of process 200 of FIG. 5 is illustrated starting at 282. At 208, the starting point is identified as a fixed time from the beginning of the music selection. Control then passes to 288 where the music genre is identified. This can be accomplished by data supplied in a header such as header 174, by user selection or any other suitable mechanism. In the case of genre A, control passes to 290 where a stopping point is identified as the starting point plus a fixed time T1 into the music file. Control then passes to 292 where the data is extracted between the starting point and stopping point to provide the sample segment from the current music selection and the process returns at 294. However, if the music genre is determined to be B at 288, control passes to 298 where the stopping point is identified as the starting point plus a different time T2 into the music file. Control then passes to 292 as previously. In accordance with this embodiment, multiple types of music can be sampled to generate a more suitable sample based upon the type of music being sampled. Thus, genre A may be considered popular music while genre B may be classical music with T1 equaling 30 seconds and T2 equaling 60 seconds. While the process 280 is illustrated as having only two selections A and B, those skilled in the art will appreciate that any number of such selections are possible and can be defined to most closely match an appropriate time period for the selection of the sample based upon the particular type of music, audio video or other program material.

Samples created in accordance with any of the processes described above can be carried out by the end user, retail establishment, record company, publicist, marketing concern, artist or other private or commercial entity interested in promoting the audio selection.

The process just described can be implemented as a computer program or script operating as a portion of, for example, a computer media player. However, many other implementations are possible without departing from the present invention. In one alternative embodiment, an email enabled personal audio player can embody the functionality of the present invention, with email facilities provided via wireless or wired communication. The compressed music sample previously described can be generated as part of a media player in one embodiment of the invention so that a user can advantageously produce a music sample of a currently playing music selection and with a single click of a computer screen icon, push of a button or other interface, initiate a process for sending that music sample to a friend (or potential customer).

Figure 8:
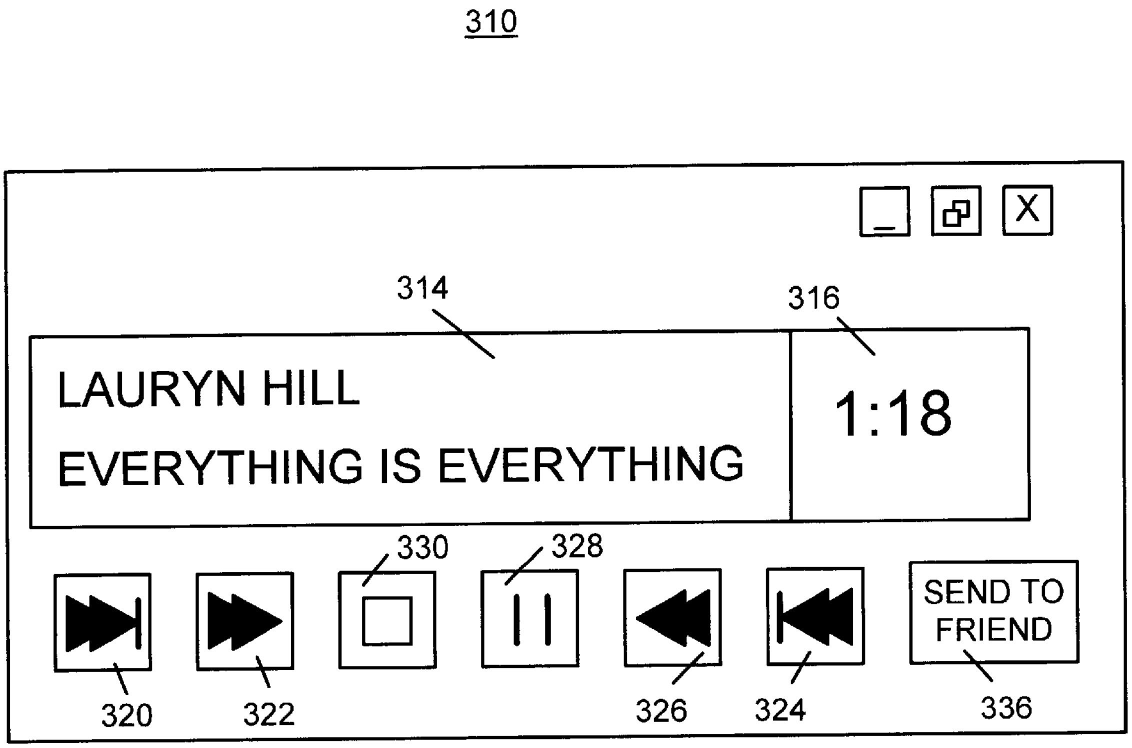
FIG. 8 illustrates an exemplary embodiment of a user interface of a media player that can employ a music clipping process according to embodiments of the present invention.

FIG. 8 shows a simplified user interface for a media player 310. Media players similar to those provided by Microsoft, Real Networks as well as ATI and other corporations can be modified to provide this function. In the illustrative interface 310 shown in FIG. 8, a display window 314 displays the artist and the name of the selection being played. Window 316 displays the elapsed time in this selection. Various play control buttons are provided such as search forward button 320, scan forward button 322, search backwards button 324, scan backwards button 326, pause button 328 and start/stop button 330 in a familiar arrangement. In addition, the interface includes a button labeled as "send to friend" button 336. In other embodiments an icon such as an email envelope icon or the like can be also utilized. In this embodiment, the media player can send a sample of the currently playing selection to a friend, acquaintance or potential purchaser by use of the button 336. Those skilled in the art will appreciate that other user interfaces could also be used without departing from the invention.

Figure 9:
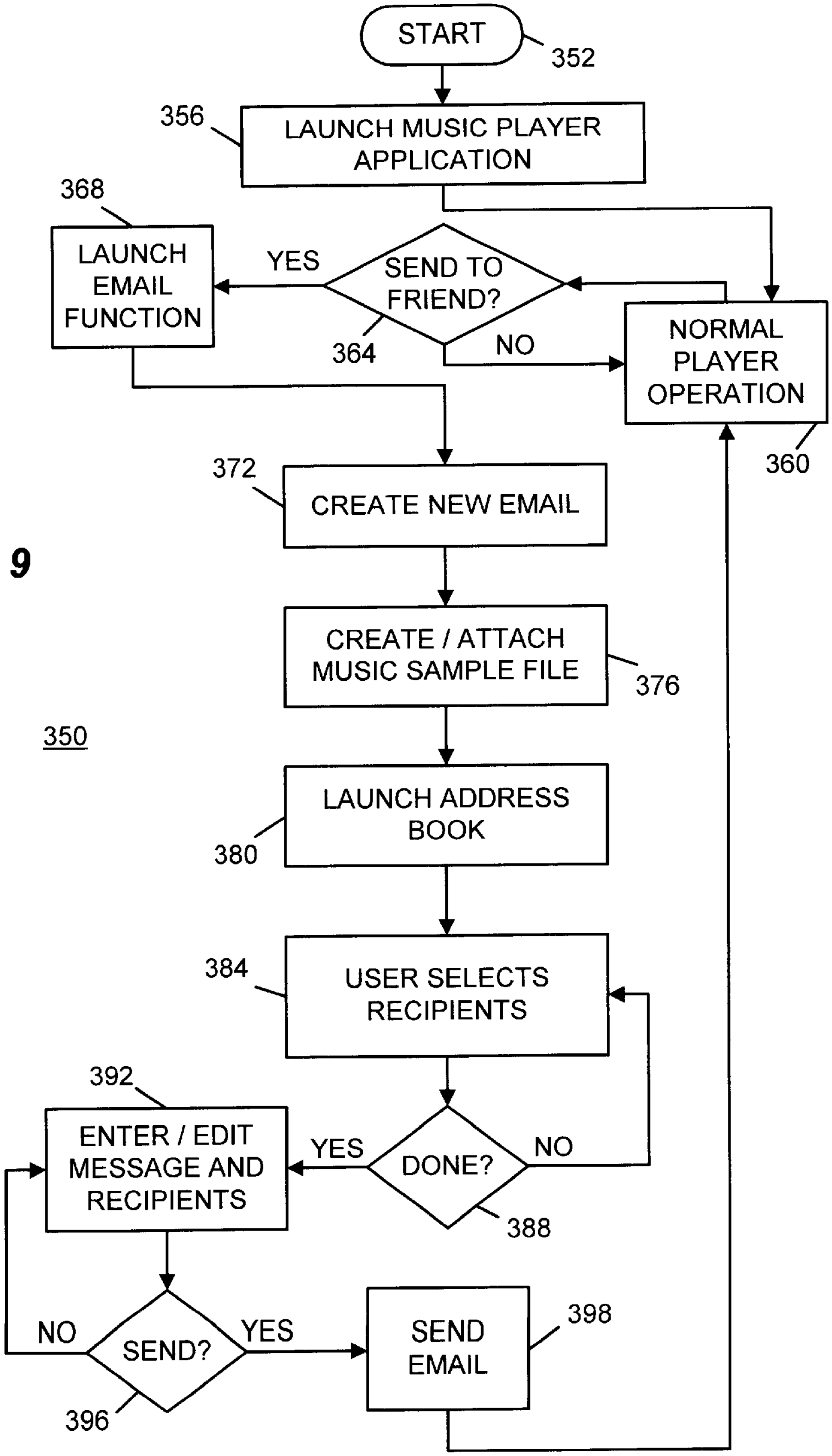
FIG. 9 is a flow chart illustrating a music clipping and distribution process consistent with certain embodiments of the present invention.

FIG. 9 illustrates a process 350 starting at 352 for utilizing the media player 310 to send an email music sample to a friend or other recipient. At 356 the music player application associated with interface 310 of FIG. 8 is launched and proceeds to normal player operation at 360. The media player at 360 operates in a normal fashion under control of the user to play compact discs, .MP3 files, .AAC files, .WMA files or other recorded media in a conventional manner until such time as the user operates the "send to friend" control 336 as detected at 364. When this occurs, an email application is launched at 368, which automatically creates a new email message at 372. Control then passes to 376 where a music sample file is attached (if it currently exists) or is created according to one of the processes previously described (or any other suitable process) and then attached to the new email. Control then passes to 380 where an address book function is launched so that the user can select recipients at 384. The user continues to select recipients for the email at 384 until completed at 388 at which point the user is passed to a conventional email edit screen wherein a new message can be created or edited at 392. The email functions just described can be carried out using an adaptation of software programs such as Microsoft Outlook™, Microsoft Outlook Express™ or Lotus Notes™ as well as other email programs commercially available.

Figure 10:
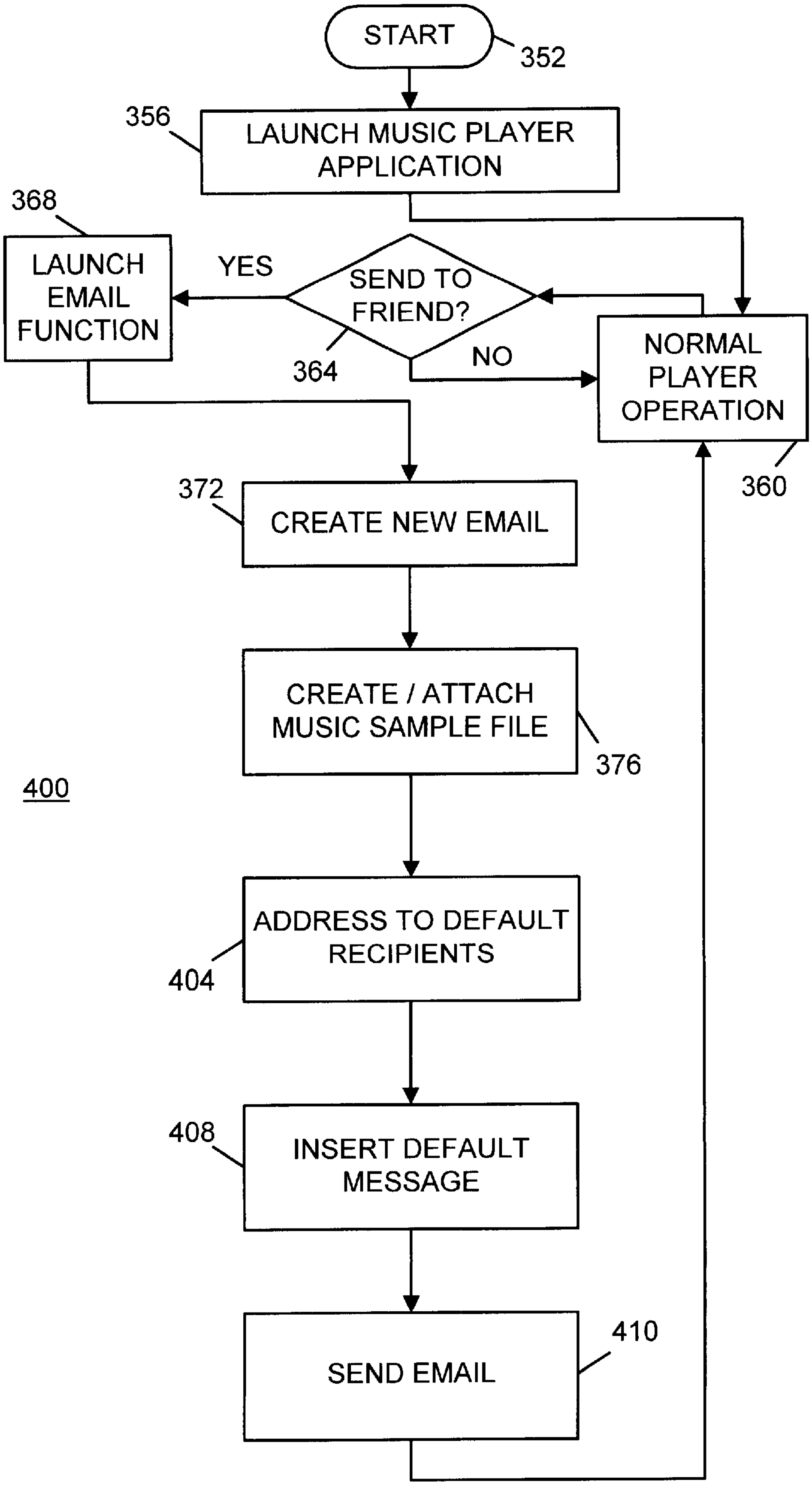
FIG. 10 is a flow chart illustrating another music clipping and distribution process consistent with certain embodiments of the present invention.

When the user has completed entering and editing the email message and recipients at 392, then the user elects to send the email by clicking a send button at 396 to cause the email to be sent at 398. Control then returns to 360 for normal media player operation. While FIG. 10 illustrates a sequential process wherein the normal media player operation is illustrated as a functional block that is separate and distinct from the process of sending the email, in preferred embodiments of the invention, the media player continues to play the music selection in the background while the creation of the email is carried out. This can be accomplished using various known techniques including buffering of the music and running the media player application as a background task. Other techniques can also be employed to permit the user to continue listening to music throughout the process described by 364 through 410 without departing from the invention. In other embodiments, the email can be created and buffered for later transmission when an email application is opened. Other variations will occur to those skilled in the art.

FIG. 10 illustrates a process 400 for carrying out a simplified process similar to that of process 350 of FIG. 9. However, in process 400, a single click of the "send to friend" icon 336 initiates the creation and/or attachment of the music sample file at 376. Control then passes to 404 where the email is addressed to one or more default recipients. A default message (e.g., "Here is a song sample I think you might like.") is inserted at 408 and the email is sent at 410 without any user intervention after clicking "send to friend". Of course, this presupposes that there has been an initial creation of default messages, default recipients, etc. In accordance with the embodiment of process 400, a predefined list of recipients automatically receives the music sample whenever the user clicks on the "send to friend" icon 336 with no further action required by the user. Those skilled in the art will recognize that numerous variations of this process are possible wherein, for example, a default message and recipient list is provided but the user is given the opportunity to edit them prior to actually sending the email. (For example, a window can be displayed giving the user, e.g., 5 seconds to click a button to change from defaults. Otherwise, the default message is sent to the default recipient along with the sample.) Moreover, process 350 and process 400 can be varied as to the order of the specific operations carried out without departing from the invention.

Those skilled in the art will recognize that the present invention has been described in terms of exemplary embodiments based upon use of a programmed processor such as that residing in a personal computer or personal music player. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form and which can be stored in any suitable electronic storage medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An automated method of extracting a representative sample from a computer readable audio file, comprising:

identifying a starting point for the representative sample in the audio file, the starting point being at a fixed time $T_{start}$ measured from the beginning of the audio file;

identifying an ending point for the representative sample in the audio file, the ending point being at a fixed time $T_{start}+T_{sample}=T_{stop}$ from the beginning of the audio file; and storing audio data representing the audio between $T_{start}$ and $T_{stop}$ as the representative sample of the audio file.

2. The method according to claim 1, further comprising compressing audio data representing the audio between $T_{start}$ and $T_{stop}$ to produce a reduced fidelity sample that is stored as the audio sample file.

3. The method according to claim 2, wherein the compressing comprises reducing a data rate of the audio data.

4. The method according to claim 1, wherein $T_{start}$ is between 30 and 60 seconds.

5. The method according to claim 1, wherein $T_{sample}$ is between approximately 30 and 60 seconds.

6. The method according to claim 1, wherein $T_{sample}$ is selected based upon a music genre.

7. The method according to claim 6, wherein the music genre is jazz and wherein $T_{sample}$ is selected to be 45 to 60 seconds.

8. The method according to claim 6, wherein the music genre is pop and wherein $T_{sample}$ is selected to be approximately 30 seconds.

9. The method according to claim 6, wherein the music genre is classical and wherein $T_{sample}$ is selected to be approximately 60 seconds.

10. The method according to claim 6, wherein the music genre is encoded within the audio file.

11. An automated method of extracting a representative sample from a computer readable file containing entertainment content, comprising:

identifying a starting point for the representative sample in the file, the starting point being identified by information embedded within the file;

identifying an ending point for the representative sample in the file, the ending point being identified by information embedded within the file; and storing data representing the content between the starting point and the ending point as the representative sample of the entertainment content contained in the computer readable file.

12. The method according to claim 11, wherein data representing the content between the starting point and the ending point is compressed to produce a reduced fidelity sample that is stored as the sample file.

13. The method according to claim 11, wherein the content comprises audio content and the starting point is between 30 and 60 seconds from the beginning of the file.

14. The method according to claim 11, wherein time between the starting point and the ending point is between approximately 30 and 60 seconds.

15. The method according to claim 11, wherein the file includes a header and wherein the starting point and ending point are defined in the header.

16. The method according to claim 11, wherein the starting point is defined by a flag embedded within the content.

17. The method according to claim 11, wherein the ending point is defined by a flag embedded within the content.

18. An electronic storage medium storing instructions which, when executed on a programmed processor, carry out an automated process of extracting a representative sample from content stored as a computer readable file, comprising:

identifying a starting point for the representative sample in the file, the starting point being at a fixed time $T_{start}$ measured from the beginning of the file;

identifying an ending point for the representative sample in the file, the ending point being at a fixed time $T_{start}+T_{sample}=T_{stop}$ from the beginning of the file; and storing data representing the content between $T_{start}$ and $T_{stop}$ as the representative sample of the content of the computer readable file.

19. The electronic storage medium according to claim 18, further comprising compressing data representing the content between $T_{start}$ and $T_{stop}$ to produce a reduced fidelity sample that is stored as the sample file.

20. The electronic storage medium according to claim 18, wherein the content comprises audio content and wherein the compressing comprises reducing a data rate of the audio data.

21. The electronic storage medium according to claim 18, wherein $T_{start}$ is between 30 and 60 seconds.

22. The electronic storage medium according to claim 18, wherein $T_{sample}$ is between approximately 30 and 60 seconds.

23. The electronic storage medium according to claim 18, wherein the content comprises music and wherein $T_{sample}$ is selected based upon a music genre.

24. The electronic storage medium according to claim 23, wherein the music genre is jazz and wherein $T_{sample}$ is selected to be 45 to 60 seconds.

25. The electronic storage medium according to claim 23, wherein the music genre is pop and wherein $T_{sample}$ is selected to be approximately 30 seconds.

26. The electronic storage medium according to claim 23, wherein the music genre is classical and wherein $T_{sample}$ is selected to be approximately 60 seconds.

27. An electronic storage medium storing instructions which, when executed on a programmed processor, carry out an automated process of extracting a representative sample from content stored as a computer readable file, comprising:

identifying a starting point for the representative sample in the file, the starting point being identified by information embedded within the file;

identifying an ending point for the representative sample in the file, the ending point being identified information embedded within the file; and storing music data representing the content between the starting point and the ending point as the representative sample of the content of the computer readable file.

28. The electronic storage medium according to claim 27, wherein content data representing the content between the starting point and the ending point is compressed to produce a reduced fidelity sample that is stored as the sample file.

29. The electronic storage medium according to claim 27, wherein the starting point is between 30 and 45 seconds from the beginning of the file.

30. The electronic storage medium according to claim 27, wherein time between the starting point and the ending point is between approximately 30 and 60 seconds.

31. The electronic storage medium according to claim 27, wherein the file includes a header and wherein the starting point and ending point are defined in the header.

32. The electronic storage medium according to claim 27, wherein the starting point is defined by a flag embedded within the content.

33. The electronic storage medium according to claim 27, wherein the ending point is defined by a flag embedded within the content.

34. An automated method of extracting a representative sample from content stored in a computer readable file, comprising:

identifying a starting point for the representative sample in the file, the starting point being at a fixed time $T_{start}$ measured from the beginning of the file;

identifying an ending point for the representative sample in the file, the ending point being at a fixed time $T_{start}+T_{sample}=T_{stop}$ from the beginning of the file; and storing data representing the content between $T_{start}$ and $T_{stop}$ as the representative sample of the content of the computer readable file.

35. The method according to claim 34, further comprising compressing the data representing the content between $T_{start}$ and $T_{stop}$ to produce a reduced fidelity sample that is stored as the sample file.

36. An apparatus that automatically extracts a representative sample from a computer readable audio file, comprising:

a programmed processor;

a program operating on the programmed processor that identifies a starting point for the representative sample in the audio file, the starting point being at a fixed time $T_{start}$ measured from the beginning of the audio file, and identifies an ending point for the representative sample in the audio file, the ending point being at a fixed time $T_{start}+T_{sample}=T_{stop}$ from the beginning of the audio file; and means for storing audio data representing the audio between $T_{start}$ and $T_{stop}$ as the representative sample of the audio file.

37. The apparatus according to claim 36, further comprising a compressor that compresses audio data representing the audio between $T_{start}$ and $T_{stop}$ to produce a reduced fidelity sample that is stored as the audio sample file.

38. The apparatus according to claim 37, wherein the compressor reduces a data rate of the audio data.

39. The apparatus according to claim 36, wherein $T_{start}$ is between 30 and 60 seconds.

40. The apparatus according to claim 36, wherein $T_{sample}$ is between approximately 30 and 60 seconds.

41. The apparatus according to claim 36, wherein a music genre is encoded within the audio file, and wherein $T_{start}$ and $T_{stop}$ are selected according to the music genre.

42. The apparatus according to claim 36, embodied within one of a personal computer and a personal media player.

43. An electronic storage medium, comprising:

a digital file containing electronic entertainment content; and instructions, embedded within the digital file, that define a starting point and an ending point of a predefined representative sample of the electronic entertainment content when read by a programmed processor.

44. The electronic storage medium according to claim 43, wherein the digital file has a header portion and a data portion, and wherein the instructions are embedded within the header portion.

45. The electronic storage medium according to claim 43, wherein the instructions comprise a start flag embedded within the entertainment content defining the starting point of the sample.

46. The electronic storage medium according to claim 43, wherein the instructions comprise a stop flag embedded within the entertainment content defining the ending point of the sample.

47. The electronic storage medium according to claim 43, embodied as a compact disc.

48. An automated method of extracting a representative sample from a computer readable music file containing a selection of music, comprising:

identifying a starting point for the representative sample in the music file, the starting point being at a fixed time $T_{start}$ measured from the beginning of the music file;

identifying an ending point for the representative sample in the music file, the ending point being at a fixed time $T_{start}+T_{sample}=T_{stop}$ from the beginning of the music file; and storing audio data representing the audio between $T_{start}$ and $T_{stop}$ as the representative sample of the music file.

49. The method according to claim 48, further comprising compressing the audio data representing the audio between $T_{start}$ and $T_{stop}$ to produce a reduced fidelity sample that is stored as the music sample file.

50. The method according to claim 49, wherein the compressing comprises reducing a data rate of the audio data.

51. The method according to claim 48, wherein $T_{start}$ is between 30 and 60 seconds.

52. The method according to claim 48, wherein $T_{sample}$ is between approximately 30 and 60 seconds.

53. The method according to claim 48, wherein $T_{sample}$ is selected based upon a music genre.

54. The method according to claim 53, wherein the music genre comprises jazz and wherein $T_{sample}$ is selected to be 45 to 60 seconds.

55. The method according to claim 53, wherein the music genre comprises pop and wherein $T_{sample}$ is selected to be approximately 30 seconds.

56. The method according to claim 53, wherein the music genre comprises classical and wherein $T_{sample}$ is selected to be approximately 60 seconds.

57. The method according to claim 53, wherein the music genre is encoded within the audio file.

58. An automated method of extracting a representative sample from a computer readable music file containing a selection of music, comprising:

identifying a starting point for the representative sample in the music file, the starting point being at a fixed time $T_{start}$ measured from the beginning of the music file, where $T_{start}$ is between 30 and 60 seconds identifying an ending point for the representative sample in the music file, the ending point being at a fixed time $T_{start}+T_{sample}=T_{stop}$ from the beginning of the music file, where $T_{sample}$ is between approximately 30 and 60 seconds and is selected based upon a music genre;

storing audio data representing the audio between $T_{start}$ and $T_{stop}$ as the representative sample of the music file; and compressing the audio data representing the audio between $T_{start}$ and $T_{stop}$ by reducing a data rate of the audio data to produce a reduced fidelity sample.

* * * * *